(12) United States Patent
Caldeira, Jr. et al.

(10) Patent No.: US 9,342,638 B1
(45) Date of Patent: May 17, 2016

(54) METHOD AND SYSTEM TO PERFORM PERFORMANCE CHECKS

(71) Applicant: Cadence Design Systems, Inc., San Jose, CA (US)

(72) Inventors: Antonio Celso Caldeira, Jr., Mountain View, CA (US); Rajeev Kumar Ranjan, Cupertino, CA (US); Marcus Vinicius da Mata Gomes, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/574,145

(22) Filed: Dec. 17, 2014

(51) Int. Cl.
*G06F 17/50* (2006.01)

(52) U.S. Cl.
CPC ........ *G06F 17/5031* (2013.01); *G06F 2217/06* (2013.01); *G06F 2217/84* (2013.01)

(58) Field of Classification Search
CPC ........................................................ G06F 17/50
USPC .......................................................... 716/107
See application file for complete search history.

(56) References Cited

U.S. PATENT DOCUMENTS

| | | | |
|---|---|---|---|
| 6,915,248 B1 | 7/2005 | Ip | |
| 7,065,726 B1 | 6/2006 | Singhal et al. | |
| 7,159,198 B1 | 1/2007 | Ip et al. | |
| 7,237,208 B1 | 6/2007 | Ip et al. | |
| 7,418,678 B1 | 8/2008 | Ip et al. | |
| 7,421,668 B1 | 9/2008 | Ip et al. | |
| 7,437,694 B1 | 10/2008 | Loh et al. | |
| 7,506,288 B1 | 3/2009 | Ip et al. | |
| 7,647,572 B1 | 1/2010 | Ip et al. | |
| 7,895,552 B1 | 2/2011 | Singhal et al. | |
| 7,966,898 B2 | 6/2011 | Roukes et al. | |
| 8,205,187 B1 | 6/2012 | Coelho et al. | |
| 8,527,911 B1 | 9/2013 | Kranen et al. | |
| 8,572,527 B1 | 10/2013 | Coelho, Jr. et al. | |
| 8,630,824 B1 | 1/2014 | Ip et al. | |
| 8,731,894 B1 | 5/2014 | Kranen et al. | |
| 8,831,925 B1 | 9/2014 | Kranen et al. | |
| 8,863,049 B1 | 10/2014 | Lundgren et al. | |
| 8,984,461 B1 | 3/2015 | Ip et al. | |
| 8,990,745 B1 | 3/2015 | Coelho et al. | |
| 9,081,927 B2 | 7/2015 | Coelho, Jr. et al. | |
| 2011/0184713 A1* | 7/2011 | Yang .................. G06F 17/5022 703/13 |
| 2015/0095862 A1 | 4/2015 | Ip et al. | |
| 2015/0100933 A1 | 4/2015 | Coelho, Jr. et al. | |

\* cited by examiner

*Primary Examiner* — Thuan Do

(74) *Attorney, Agent, or Firm* — Vista IP Law Group, LLP

(57) ABSTRACT

An improved approach is provided to implement performance checking. A check is performed as to whether two designs are equivalent without needing to analyze their outputs on a cycle-by-cycle basis, where the two designs are checked to see if they are equivalent on the transaction-level. Thereafter, the outputs for the transactions are analyzed relative to delay time periods, which allows verification and identification of possible performance issues and differences between the two designs.

21 Claims, 19 Drawing Sheets

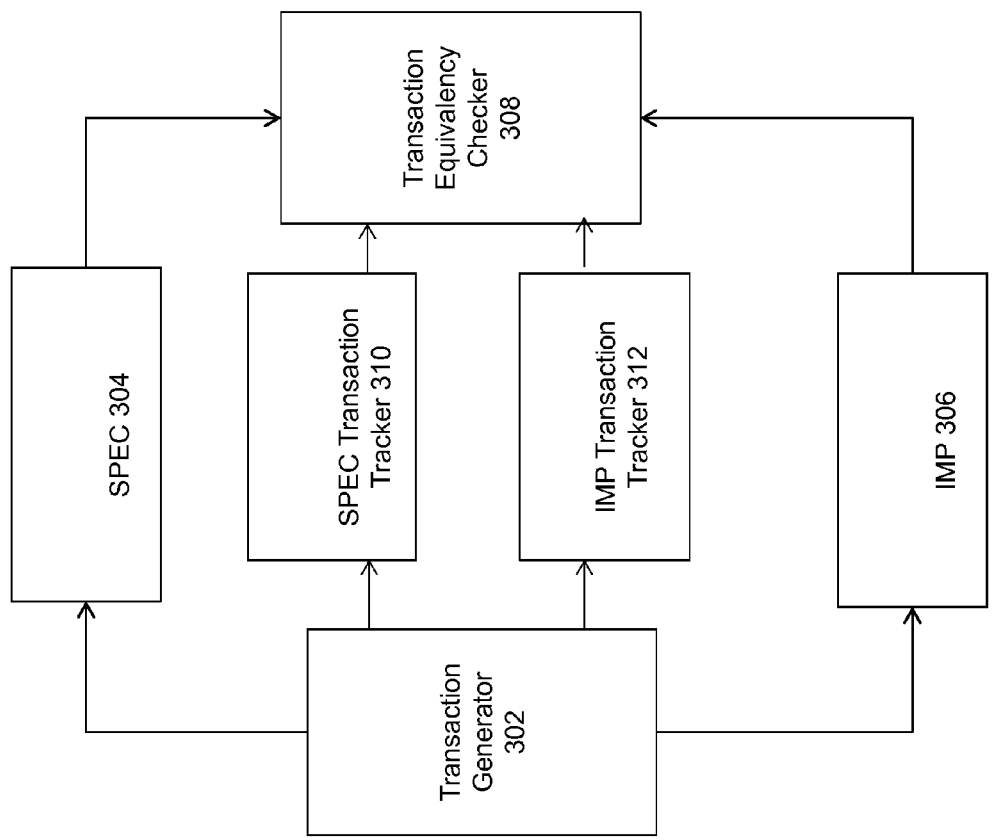

METHOD AND SYSTEM TO PERFORM PERFORMANCE CHECKS

CROSS-REFERENCE TO RELATED APPLICATIONS

This application is related to U.S. Ser. No. 14/574,113, entitled "METHOD AND SYSTEM TO PERFORM EQUIVALENCY CHECKS", filed on even date herewith, which is hereby incorporated by reference in its entirety.

BACKGROUND

This disclosure relates generally to verification of circuit designs, and more specifically to equivalence checking of circuit designs.

Over the last 30 years, the complexity of integrated circuits has increased greatly. This increase in complexity has exacerbated the difficulty of verifying circuit designs. In a typical integrated circuit design process, which includes many steps, the verification step may consume approximately 70-80% of the total time and resources. Aspects of the circuit design such as time-to-market and profit margin greatly depend on the verification step. As a result, flaws in the design that are not found during the verification step can have significant economic impact by increasing time-to-market and reducing profit margins.

As the complexity in circuit design has increased, there has been a corresponding improvement in various kinds of verification and debugging techniques. In fact, these verification and debugging techniques have evolved from relatively simple transistor circuit-level simulation (in the early 1970s) to logic gate-level simulation (in the late 1980s) to the current art that uses Register Transfer Language (RTL)-level simulation. RTL describes the registers of a computer or digital electronic system and the way in which data are transferred among them.

Existing verification and debugging tools are used in the design flow of a circuit. The design flow begins with the creation of a circuit design at the RTL level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical design tools to create a HDL-based design.

In the design flow, creation of the RTL source code is followed by verification of the design to check if the RTL source code meets various design specifications. Formal verification is one such technique for verifying the circuit design. Formal verification uses mathematical techniques to prove that, under a set of constraints, a design property is either always correct or to provide an example condition (called a counterexample) that demonstrates the property is false. Tools that use formal methods to verify RTL source code and design properties are known as "model checkers." Design properties to be verified include specifications and/or requirements that must be satisfied by the circuit design. Since mathematical properties define the design requirements in pure mathematical terms, this enables analysis of all possible valid inputs for a given circuit and is akin to an exhaustive simulation.

One type of verification that is often performed on circuit designs is equivalence checking. Equivalence checking is performed to determine whether two designs exhibit the same functional behavior. This type of verification is often used, for example, when a circuit is modified during the design process, and there is a need to make sure that the modified (implementation or "IMP") version of the circuit is functionality equivalent to a baseline (specification or "SPEC") version of the circuit. One reason to perform this type of check is to make sure that the IMP version of a circuit (e.g., that has been modified and/or includes new features) will function properly and be backwards compatible in the context of an existing circuit design.

"Sequential" equivalence checking (SEC) is performed to verify whether two designs exhibit the same behavior at design interfaces. This type of equivalence check ignores internal functional behaviors at state elements, and only checks whether outputs match between the two designs. This is in contrast to combinational equivalence checking (CEC) that check whether two designs exhibit the same functional behavior at all state elements.

The problem with traditional sequential equivalency checking approaches is that they cannot function properly when the two designs are not matchable on a cycle-by-cycle basis. This occurs, for example, in the context of designs whose interface validity is governed by handshake protocols. In this circumstance, the traditional equivalency checking approaches will fail to determine whether the two designs are equivalent at their design interfaces, since there will likely be discrepancies on a cycle basis, regardless of whether the functionality match between the two designs. Similarly, verification of worst-case performance delays between such designs was not possible before with traditional sequential equivalency checking solutions.

Therefore, there is a need for an improved approach to perform equivalency checking of circuit designs that address these and other problems.

SUMMARY

An improved approach is provided to implement performance checking. A check is performed as to whether two designs are equivalent without needing to analyze their outputs on a cycle-by-cycle basis, where the two designs are checked to see if they are equivalent on the transaction-level. Thereafter, the outputs for the transactions are analyzed relative to delay time periods, which allows verification and identification of possible performance issues and differences between the two designs.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The teachings of the embodiments of the present disclosure can be readily understood by considering the following detailed description in conjunction with the accompanying drawings.

FIGS. 3A through 3I-2 provide an illustrative example of an embodiment of the present disclosure.

DETAILED DESCRIPTION

Figure 1:
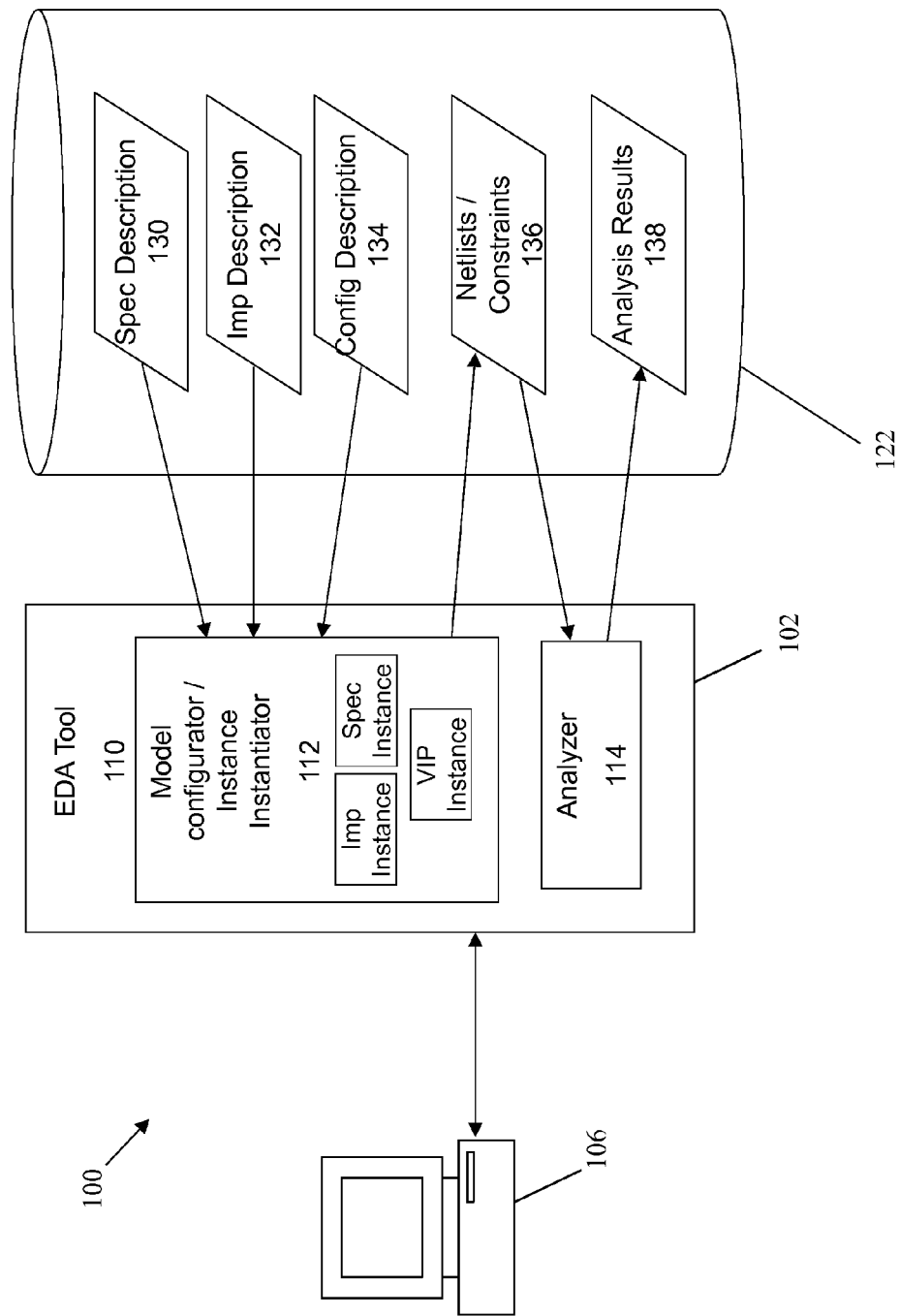
FIG. 1 illustrates an example system which may be employed in some embodiments of the invention to perform equivalency checking.

The figures and the following description relate to certain embodiments of the present disclosure by way of illustration only. It should be noted that in the following discussion, alternative embodiments of the structures and methods disclosed herein will be readily recognized as viable alternatives that may be employed without departing from the principles of the present disclosure. Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

As noted above, traditional sequential equivalency checking methods verify that when inputs of two different designs are tied together, the outputs will match in a cycle-by-cycle relationship. Therefore, such traditional approaches cannot function properly when the two designs are not matchable on a cycle basis. This occurs, for example, in the context of designs whose interface validity is governed by handshake protocols. In this circumstance, the traditional equivalency checking approaches will fail to determine whether the two designs are equivalent at their design interfaces, since there will likely be discrepancies on a cycle basis, regardless of whether the input and outputs match between the two designs. Similarly, verification of worst-case performance delays between such designs was not possible with traditional sequential equivalency checking solutions.

For example, consider when an original design (Spec) is modified with the addition of a pipeline to create a new design (Imp). In this situation, verification that the two designs are equivalent in terms of packet transmission relies on observation of handshaking between them, where the handshake depends on the pipeline depths. This circumstance may introduce delays differently between Spec and Imp, such that the mapping capabilities in traditional approaches to implement sequential equivalency checking would not be able to handle such scenarios since the handshake depends on the input pattern.

According to some embodiments, the present invention checks whether two designs are equivalent without needing to analyze their outputs on a cycle-by-cycle basis. Instead, the two designs are checked to see if they are equivalent on the transaction-level. This approach abstracts the timing delays between Imp and Spec, which allows verification of data transportation and transformation between the Imp and Spec designs. In this manner, the equivalency checking no longer needs to determine whether the outputs match given a certain mapping function. Instead, the approach verifies that design transaction-level functionality is equivalent in the Imp and Spec designs.

This permits equivalence checking to be performed on electrical designs even when handshake protocols are observed. The solution is generic and parameterized—not only does it support different protocols between inputs and outputs, but the approach also supports different protocols between Imp and Spec.

Some embodiments are directed to an improved approach to implement equivalency checking. According to some embodiments, the present invention checks whether two designs are equivalent without needing to analyze their outputs on a cycle-by-cycle basis. Instead, the two designs are checked to see if they are equivalent on the transaction-level. This approach abstracts the timing delays between Imp and Spec, which allows verification of data transportation and transformation between the Imp and Spec designs. In this manner, the equivalency checking no longer needs to determine whether the outputs match given a certain mapping function. Instead, the approach verifies that design transaction-level functionality is equivalent in the Imp and Spec designs.

Performance checking can thereafter be performed on the two designs. The outputs for the transactions are analyzed relative to delay time periods, which allows verification and identification of possible performance issues and differences between the two designs.

FIG. 1 illustrates an example system 100 which may be employed in some embodiments of the invention to perform equivalency checking for a Spec design 130 and Imp design 132. The system 100 may include one or more users at one or more user station(s) 106 that operate the system 100 to verify electronic designs. Such users include, for example, design engineers or verification engineers. User station 106 comprises any type of computing station that may be used to operate, interface with, or implement EDA (Electronic Design Automation) applications or devices, such as EDA tool 110. Examples of such user stations 106 include for example, workstations, personal computers, or remote computing terminals. User station 106 comprises a display device, such as a display monitor, for displaying electronic design analysis results 138 to users at the user station 106. User station 106 also comprises one or more input devices for the user to provide operational control over the activities of system 100, such as a mouse or keyboard to manipulate a pointing object in a graphical user interface.

The electronic design data/descriptions 130 and 132 may be stored in a computer readable storage device 122. The electronic design descriptions correspond to any form of electrical design data that needs to be analyzed by the EDA tool 110. Computer readable storage device 122 includes any combination of hardware and/or software that allows for ready access to the data that is located at the computer readable storage device 122. For example, computer readable storage device 122 could be implemented as computer memory operatively managed by an operating system. The computer readable storage device 122 could also be implemented as an electronic database system having storage on persistent and/or non-persistent storage.

One or more EDA tools 110 may be used by users at a user station 106 to analyze the Spec description 130 and Imp description 132, and to generate analysis results 138. The Imp description 132, or implementation description, is for example an RTL or gate-level description of an improved design. The Spec description 130, or specification description, is for example an RTL or gate-level description of a current/baseline design. A transaction VIP (verification IP) configuration description 134 is accessed that includes parameter settings and glue logic used to configure the transaction-level equivalency and performance checking VIP.

The transaction model configurator/instance instantiator 112 receives the IMP description 132, Spec description 130, and transaction VIP configuration description 134. The configurator/instantiator 112 configures the parameters and logic to be connected using the description elements to instantiate a configured instance of the imp design and a configured instance of the spec design. A configured instance of transaction-level equivalency checking and performance VIP is also instantiated. As described in more detail below, the VIP includes a consistent transaction generator, Spec transaction tracker, Imp transaction tracker, transaction equivalency checker and/or transaction performance checker.

The VIP connects and configures the SPEC and IMP designs together with the glue logic that determine the relevant internal components for each design (e.g., clocks, resets, incoming control, incoming data, outgoing control, outgoing data for each design). This allows the VIP to snoop traffic and check the designs' consistency. In some embodiments, clocks are taken into account, including for example, a global (test bench) clock, imp clock, and spec clock, where the test bench clock is the fastest clock in certain embodiments. A reset signal is used to reset internal VIP structures and does not limit the block's reset in some embodiments, to enable verification of blocks during a reset phase.

The transaction model configurator/instance instantiator 112 receives the Imp instance, Spec instance, and transaction VIP instance, and generates netlists/constraints 136. The netlists/constraints 136 include the problem statement to be solved by the analyzer 114. The analyzer 114 receives the netlists/constraints 136, and verifies the correctness of the performance and equivalency properties of the Imp and Spec designs. Analysis results 138 are generated from the analyzer 114. In some embodiments, the analysis results 138 comprise a set of yes/no answers regarding proof results.

According to some embodiments, the analyzer 114 implements a transaction-based formal verification approach to verify the equivalence of the circuit designs. Formal verification uses mathematical techniques to prove that, under a set of constraints, a design property is either always correct or to provide an example condition that demonstrates the property is false. Design properties to be verified include specifications and/or requirements that must be satisfied by the circuit design. Since mathematical properties define the design requirements in pure mathematical terms, this enables analysis of all possible valid inputs for a given circuit and is akin to an exhaustive simulation.

Figure 2:
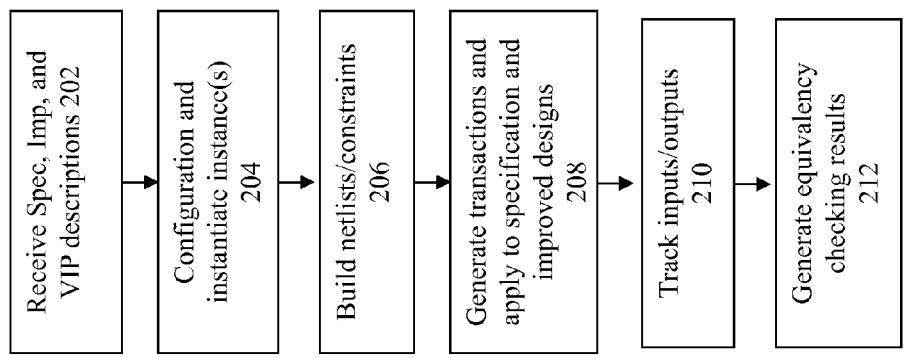
FIG. 2 shows a flowchart of an approach to perform equivalency checking according to some embodiments of the invention.

FIG. 2 shows a flowchart of an approach to perform equivalency checking according to some embodiments of the invention. At 202, the Imp, Spec, and VIP descriptions are received for processing. The Imp description corresponds to an RTL or gate-level description of an improved design. The Spec description corresponds to an RTL or gate-level description of a specification design. The transaction VIP configuration description includes parameter settings and glue logic to configure the transaction-level equivalency and performance checking VIP.

At 204, configuration is performed of the parameters and logic to be connected using the description elements to instantiate a configured instance of the imp design and a configured instance of the spec design. A configured instance of transaction-level equivalency checking and performance VIP is also instantiated. The VIP includes a consistent transaction generator, Spec transaction tracker, Imp transaction tracker, transaction equivalency checker and/or transaction performance checker.

A synthesis action is then performed at 206 to generate a set of netlists/constraints for the Imp and Spec. The netlists/constraints include the problem statement to be solved by the system.

At 208, transactions are generated that are applied to the models of the Imp and Spec designs. Formal analysis is performed to take the netlists/constraints, and to search all possible combinations to verify correctness of performance and equivalency properties for the designs.

At 210, the transactions are tracked going through the Imp and Spec designs. The same transaction ordering and content is implemented for both designs, while remaining flexible with regards to timing. This is performed by observing rules for both the input side and the output side. Regarding the input side (e.g., transactions pushed into the design): (a) transactions are forced into Imp and Spec that are equivalent in ordering and in content, but not necessarily the same protocol; and (b) Imp and Spec are permitted to accept transactions at different times. Regarding the output side (e.g., transactions popped from the design): (a) checking is performed of transactions read from the Imp and Spec that are equivalent in ordering and in content, but not necessarily the same protocol; and (b) Imp and Spec are permitted to transmit transactions at different times.

At 212, analysis results are generated. In the current embodiment, equivalency checking is performed to check for the equivalency of data on the transaction-level, where a check is made to determine whether all data that is output by one design is also output by the other in the same order.

FIGS. 3A through 3I-2 provide an illustrative example of an embodiment of the present disclosure. In these figures, Spec 304 represents a configured instance of the Spec design and Imp 306 represents a configured instance of the Imp design. The transaction generator 302 generates transactions that are pushed to the Spec 304 and Imp 306. The transaction generator 302 also operates to ensure that transactions pushed to the Spec 304 and Imp 306 designs are consistent in ordering and content.

In some embodiments, it is not required that the Spec 304 and Imp 306 use the same protocol. For data-dependent designs (e.g., designs where the data history can change data paths) a FIFO is used to constraint inputs going into the Spec 304 and Imp 306, ensuring that all transaction controls and content are the same. Configurations can be applied (e.g., by a user) to set the depth of the FIFO, where assertions are created to detect overflow/underflow conditions. For data-independence, a FIFO may not be necessary since the transaction history may not be relevant, and as such only one transaction is needed to check consistency between two designs. This means that a single flop can be used to track an arbitrary transaction going through the Spec 304 and Imp 306.

The Spec transaction tracker 310 tracks transactions that enter the Spec 304 but have not yet come out. This component tracks how many transactions proceed in and out of the Spec 304 design. Similarly, the Imp transaction tracker 312 tracks transactions that proceed in and out of the Imp 306 design.

The transaction equivalency checker 308 takes into account the information tracked by trackers 310 and 312 to determine whether the two designs are equivalent. With transaction order/numbering being tracked by the trackers both into and out of the Imp and Spec designs, the transaction equivalency checker 308 is able to understand the specific transaction numbers to be checked (e.g., in case Spec and Imp are not synchronized with regards to transactions going out). The transaction equivalency checker 308 also counts the number of cycles a transaction spent in-flight inside the Spec and Imp designs. This count can be implemented by maintaining a counter that starts when selected transaction goes into the Spec/Imp designs and keeps counting until it is ready to go out.

The transaction equivalency checker 308 creates one or more properties to verify (e.g., using formal analysis) such that all combinations of transactions coming out of Spec and Imp are consistent in both ordering and content between one another.

Figure 3B:
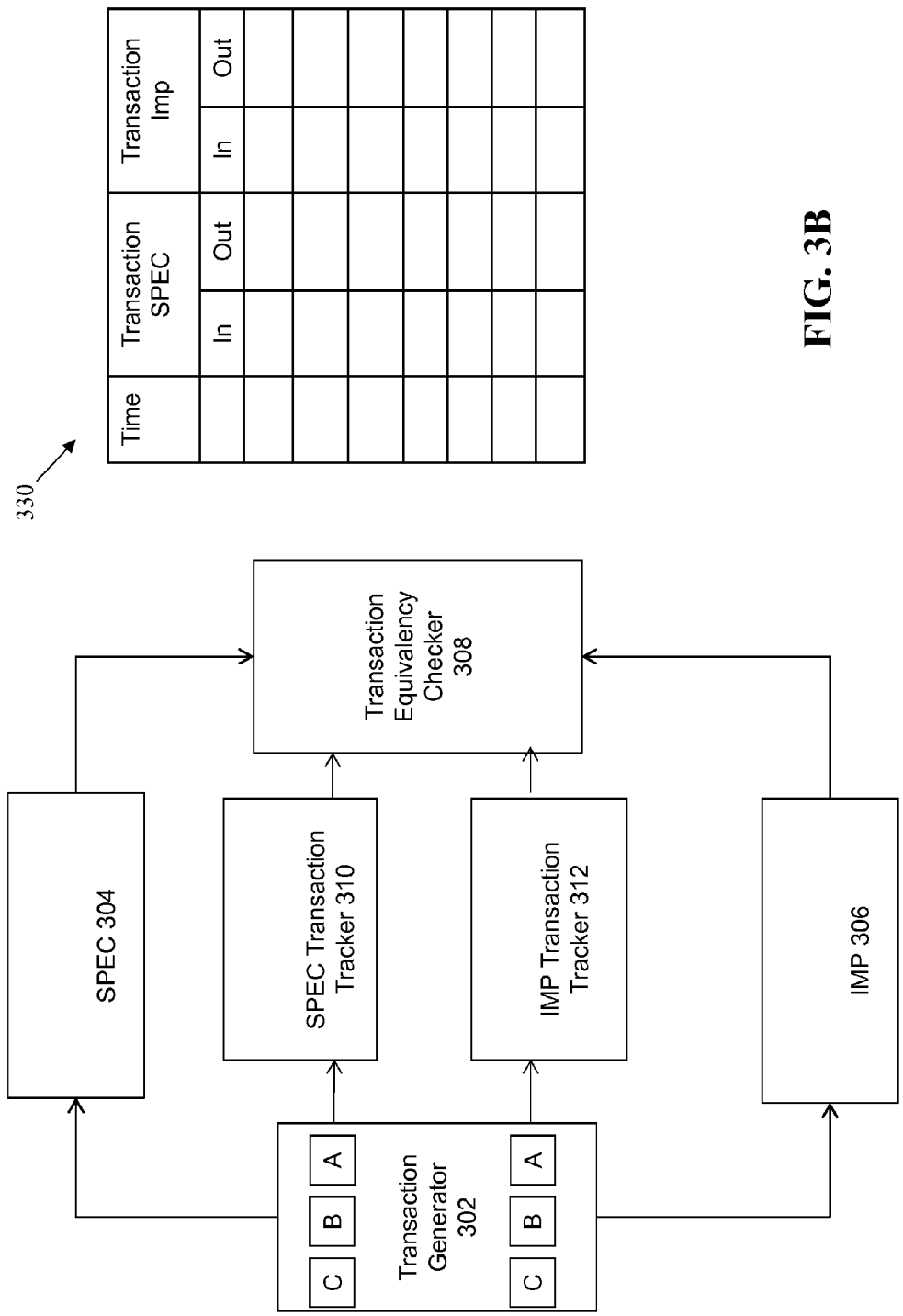

As shown in FIG. 3B, consider if a series of transactions A, B, and C are generated by the transaction generator 302. The same series of transactions A, B, and C are to be applied to each of Spec 304 and Imp 306 in the same order, although not necessarily at the same clock cycle. The trackers 310 and 312 will track the progress of these transactions through Spec 304 and Imp 306, respectively, with the tracked values being represented in table 330.

Figure 3C:
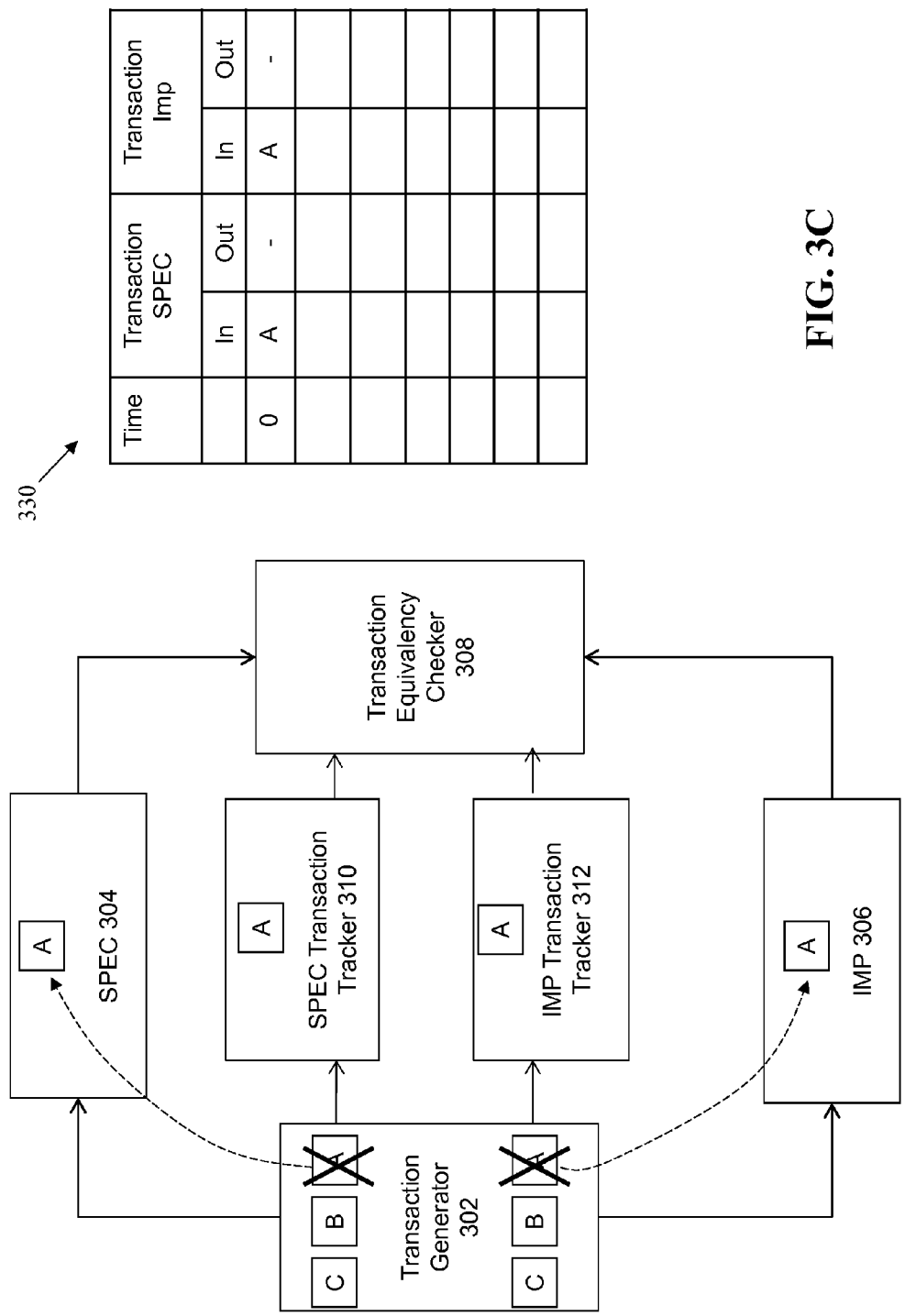

FIG. 3C shows the situation at time 0, where the first transaction A has been applied to each of the Spec 304 and Imp 306. This is visually represented in the figure by the A symbol being inserted into 304 and 306. The Spec tracker 310 has tracked the entry of transaction A into Spec 304, which is visually represented in the figure by having the symbol A inserted into box 310. Similarly, Imp tracker 312 has tracked the entry of transaction A into Imp 306, which is visually represented in the figure by having the symbol A inserted into box 312. Table 330 has also been updated to reflect that at time 0, the first transaction A has been applied as inputs to each of the Spec 304 and Imp 306.

Figure 3D:
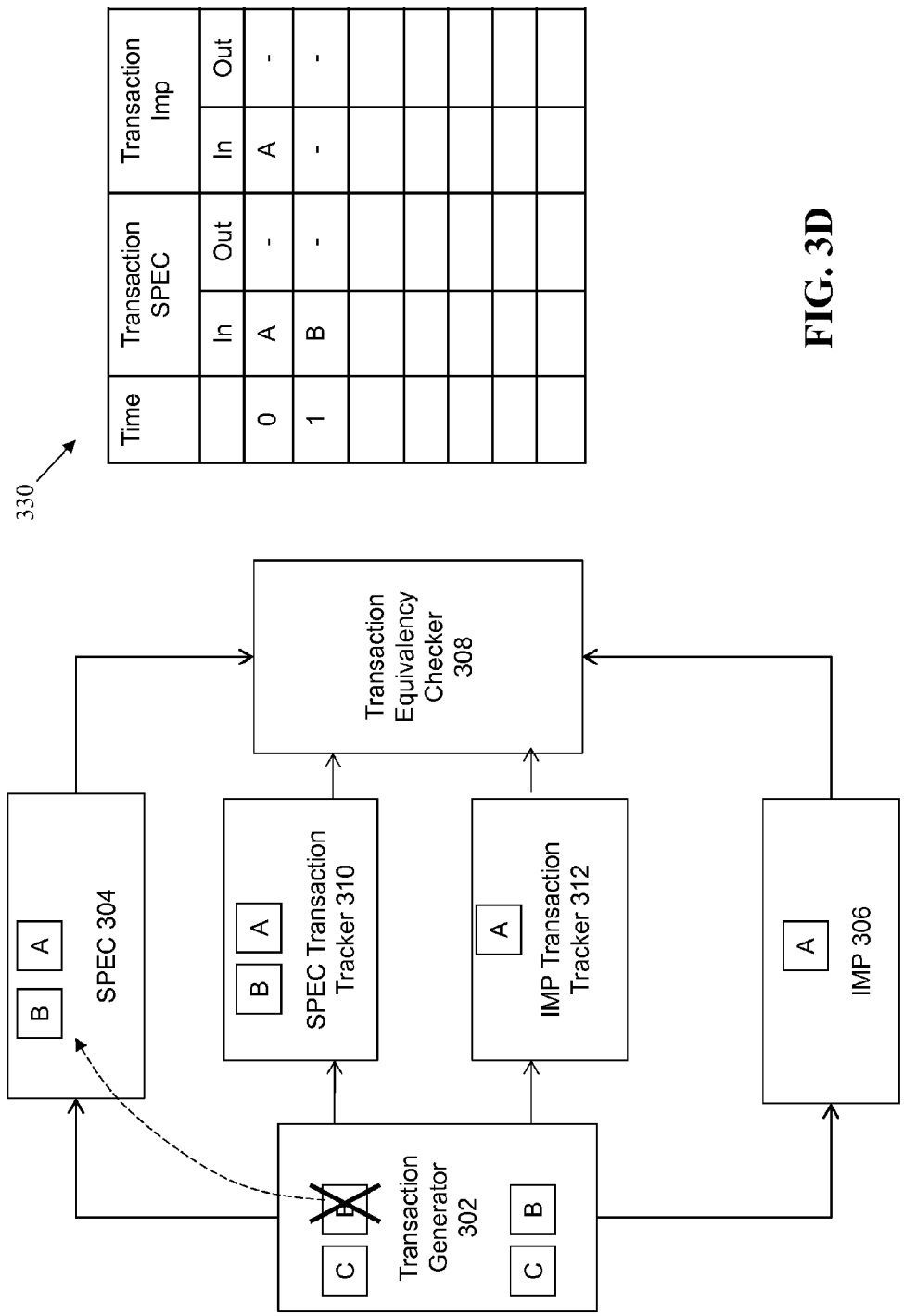

FIG. 3D represents the activity of the checking process at time 1. Here, transaction B has now been applied to Spec 304. This is visually represented in the figure by the B symbol being inserted into box 304. The Spec tracker 310 has tracked the entry of transaction B into Spec 304, which is also visually represented in the figure by having the symbol B inserted into box 310.

It is noted that transaction B has not been applied to Imp 306. This means that a cycle-by-cycle discrepancy has now occurred on the input side between Spec 304 and Imp 306. This can be seen in table 330, which has been updated to reflect that at time 1, the second transaction B has been applied to Spec 304, but not to Imp 306.

Figure 3E:
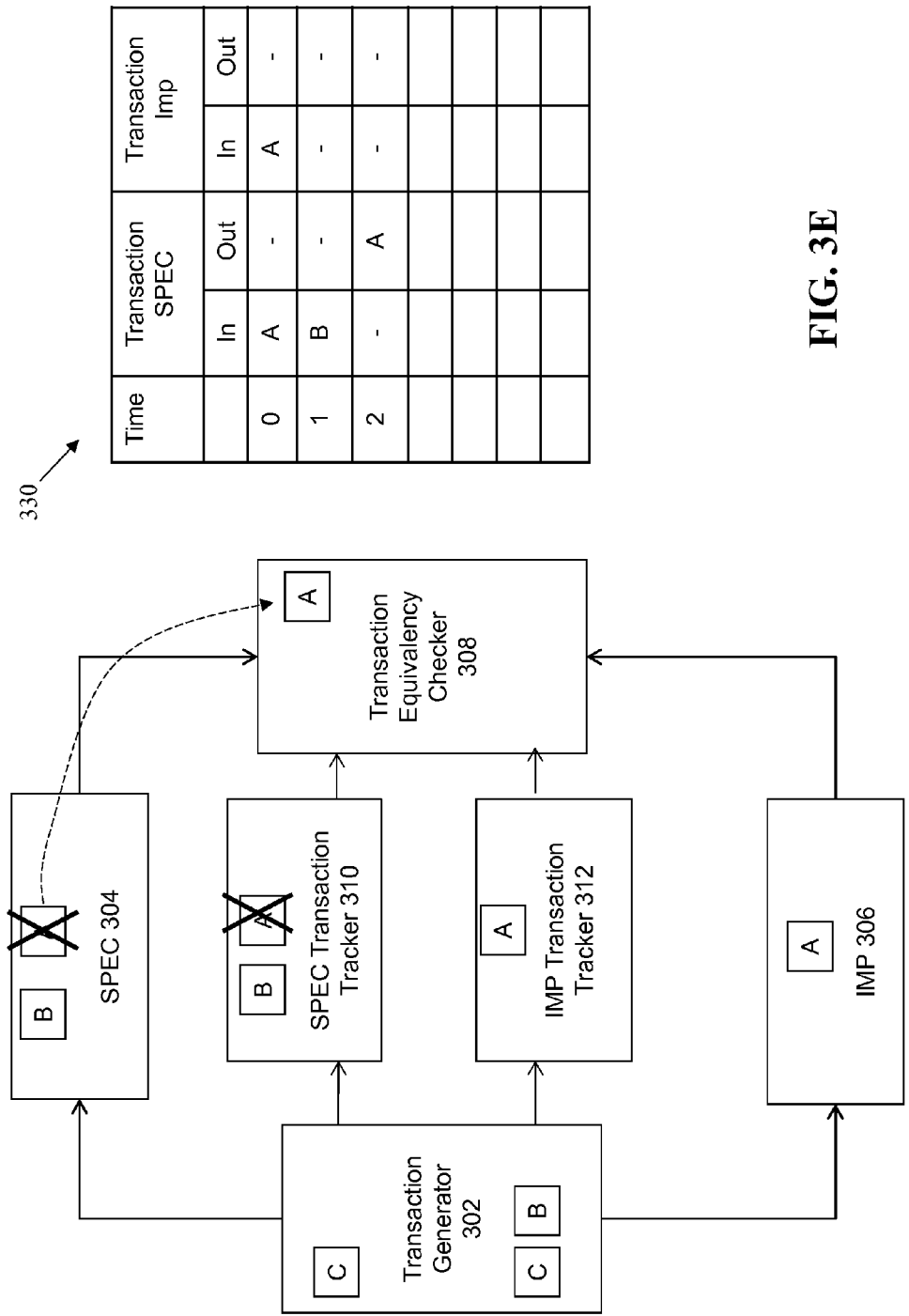

FIG. 3E represents the activity of the checking process at time 2. Here, transaction A has now proceeded through Spec 304. This is visually represented in the figure by the A symbol being removed from box 304 and now being included in the upper portion of box 308. The Spec tracker 310 has tracked the exit of transaction A from Spec 304, which is also visually represented in the figure by removing the symbol A from box 310.

It is noted that transaction A has not yet proceeded through Imp 306. This means that another cycle-based discrepancy has now occurred between Spec 304 and Imp 306, but now on the output side. This can be seen in table 330, which has been updated to reflect that at time 2, transaction A has proceeded out of Spec 304, but has not yet proceeded out of Imp 306.

Figure 3F:
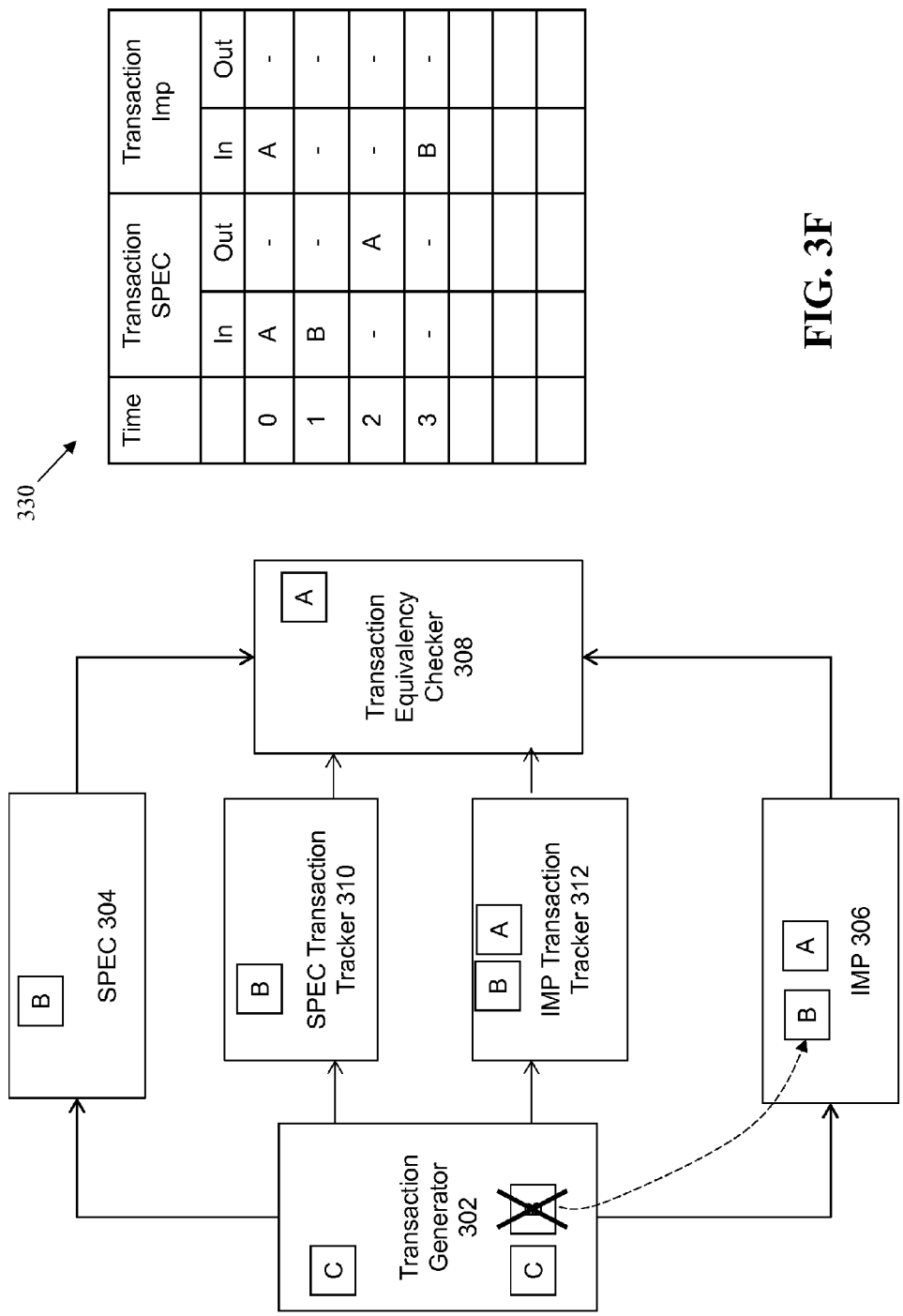

FIG. 3F represents the activity of the checking process at time 3. Here, transaction B has now been applied to Imp 306. This is visually represented in the figure by the B symbol being inserted into box 306 and being removed from box 302. The Imp tracker 312 tracks the entry of transaction B into Imp 306, which is visually represented in the figure by having the symbol B inserted into box 312. Table 330 is also updated to reflect that at time 3, transaction B has been applied to Imp 306.

Figure 3G:
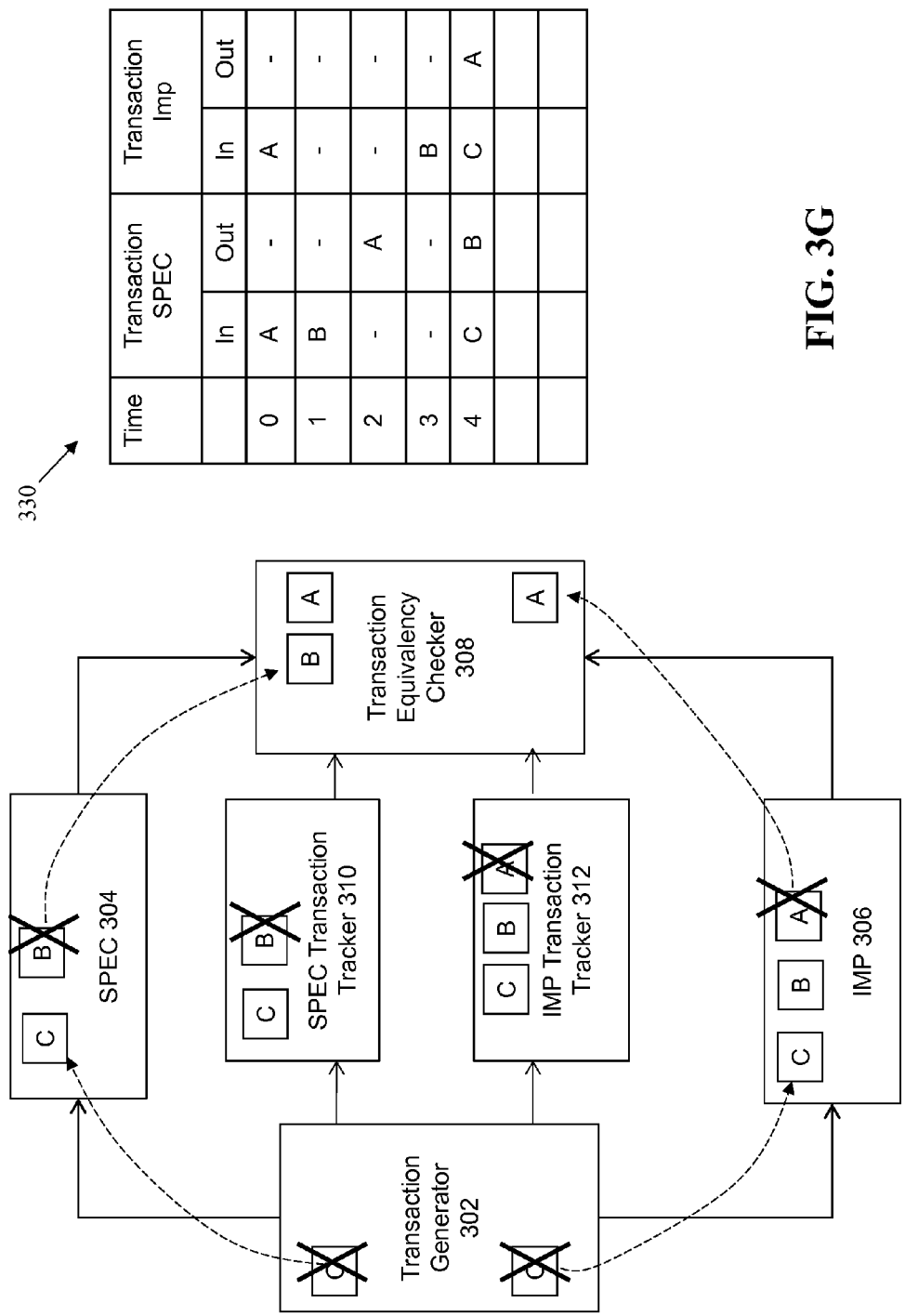

FIG. 3G represents the activity of the checking process at time 4. At this clock cycle, transaction C has now been applied to both Spec 304 and Imp 306. This is visually represented in the figure by the C symbol being inserted into both 304 and 306 and being removed from box 302. The Spec tracker 310 tracks the entry of transaction C into Spec 304, which is visually represented in the figure by having the symbol C inserted into box 310. Similarly, Imp tracker 312 has tracked the entry of transaction C into Imp 306, which is visually represented in the figure by having the symbol C inserted into box 312.

In addition, transaction A has now proceeded through Imp 306. This is visually represented in the figure by the A symbol being removed from box 306 and now being included in the lower portion of box 308. The Imp tracker 312 has tracked the exit of transaction A from Imp 306, which is also visually represented in the figure by removal of the symbol A from box 312.

At this time, transaction B has also proceeded all the way through Spec 304. This is visually represented in the figure by the B symbol being removed from box 304 and now being included in the upper portion of box 308. The Spec tracker 310 has tracked the exit of transaction B from Spec 304, which is also visually represented in the figure by removing the symbol B from box 310.

Table 330 has also been updated to reflect all of this activity at time 4. The row in table corresponding to time 4 has been updated to show that transaction C has been applied to each of the Spec 304 and Imp 306. The row in table corresponding to time 4 has also been updated to show that transaction B has proceeded out of Spec 304, and that transaction A has proceeded out of Imp 306.

Figure 3H:
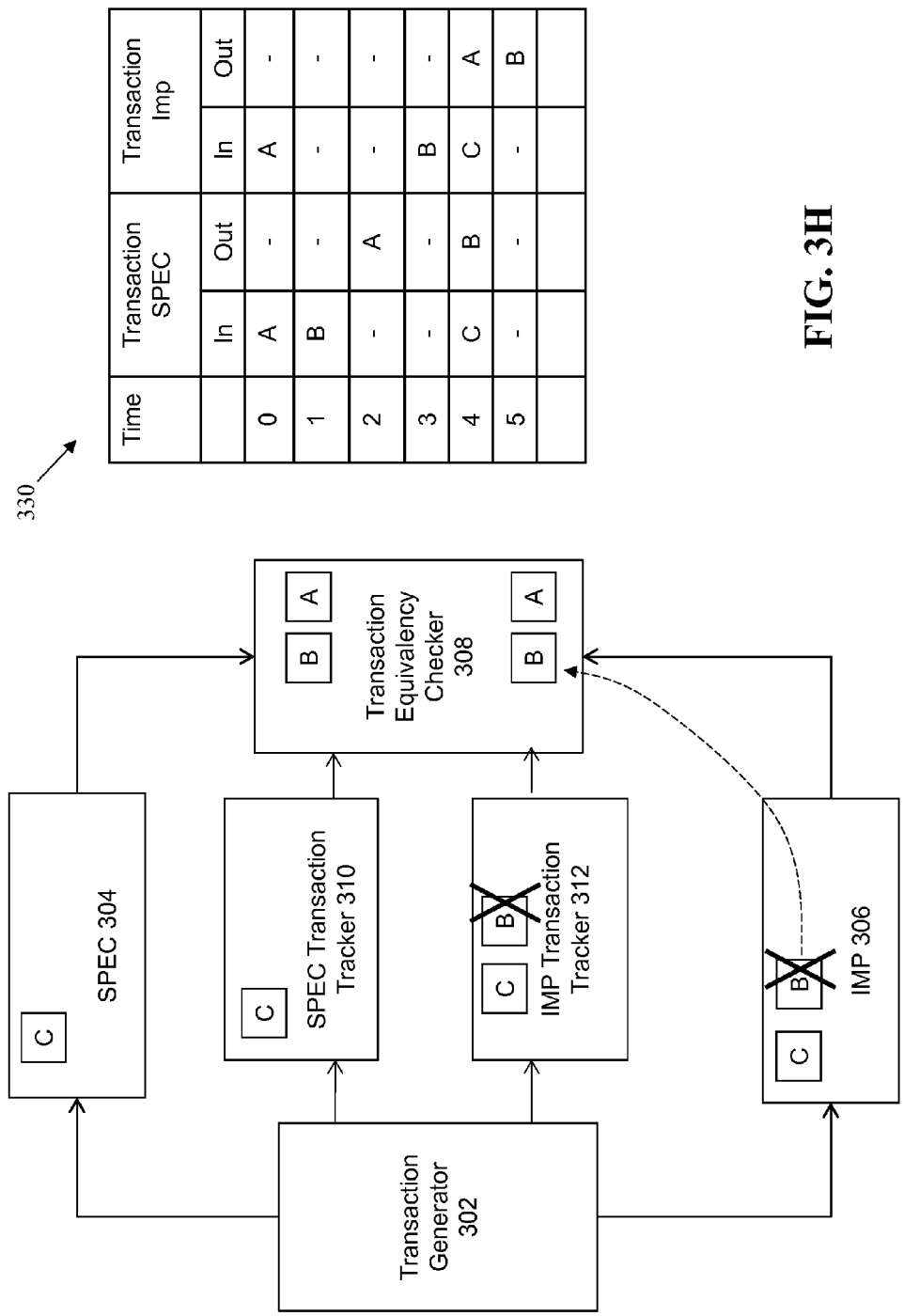

FIG. 3H represents the activity of the checking process at time 5. At this time, transaction B has now proceeded through Imp 306. This is visually represented in the figure by the B symbol being removed from box 306 and now being included in the lower portion of box 308. The Imp tracker 312 has tracked the exit of transaction B from Imp 306, which is also visually represented in the figure by removal of the symbol B from box 312. Table 330 has been updated to reflect that transaction B has proceeded out of Imp 306 at time 5.

Figures 1, 3I:
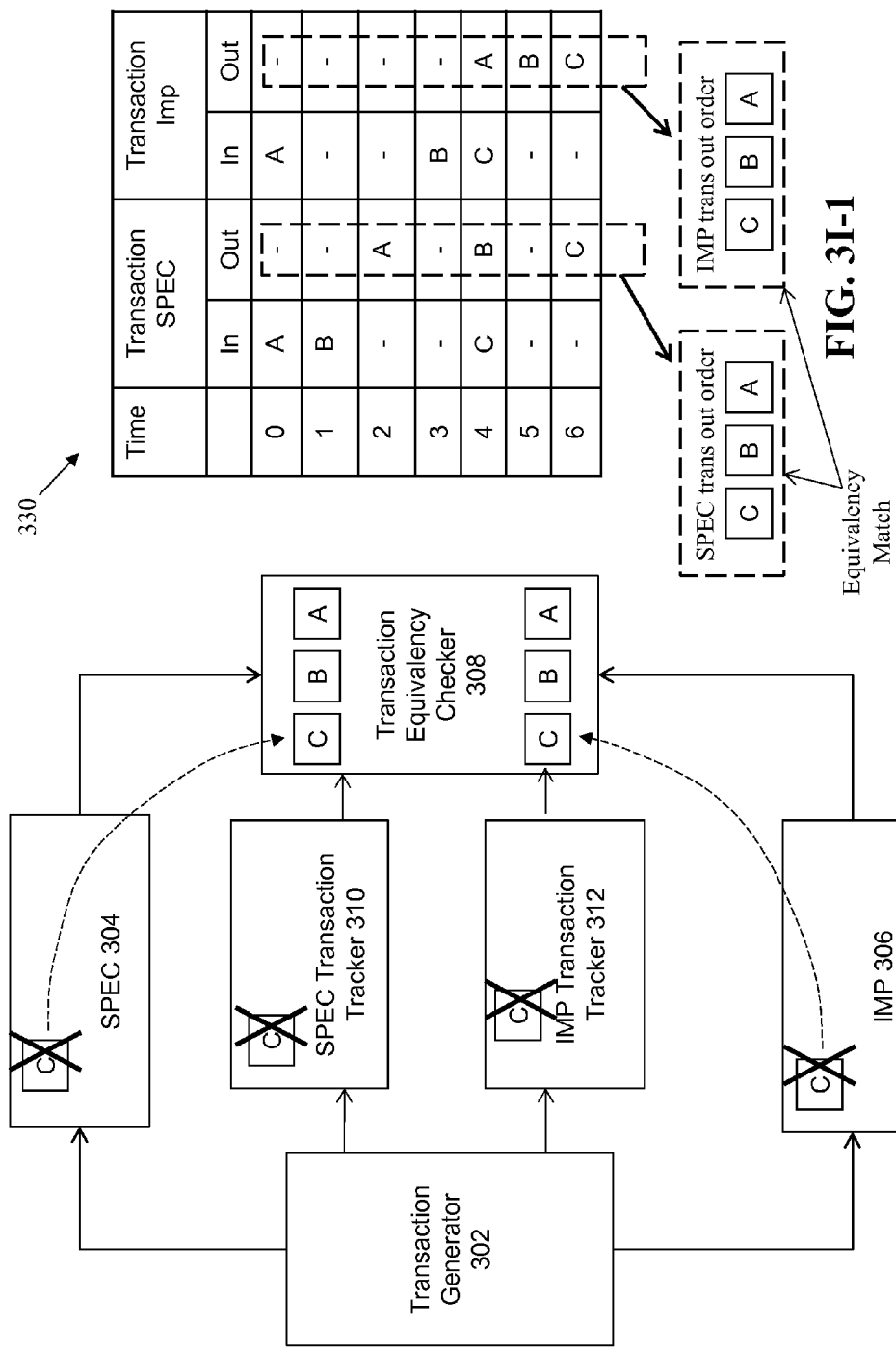
Figures 2, 3I:
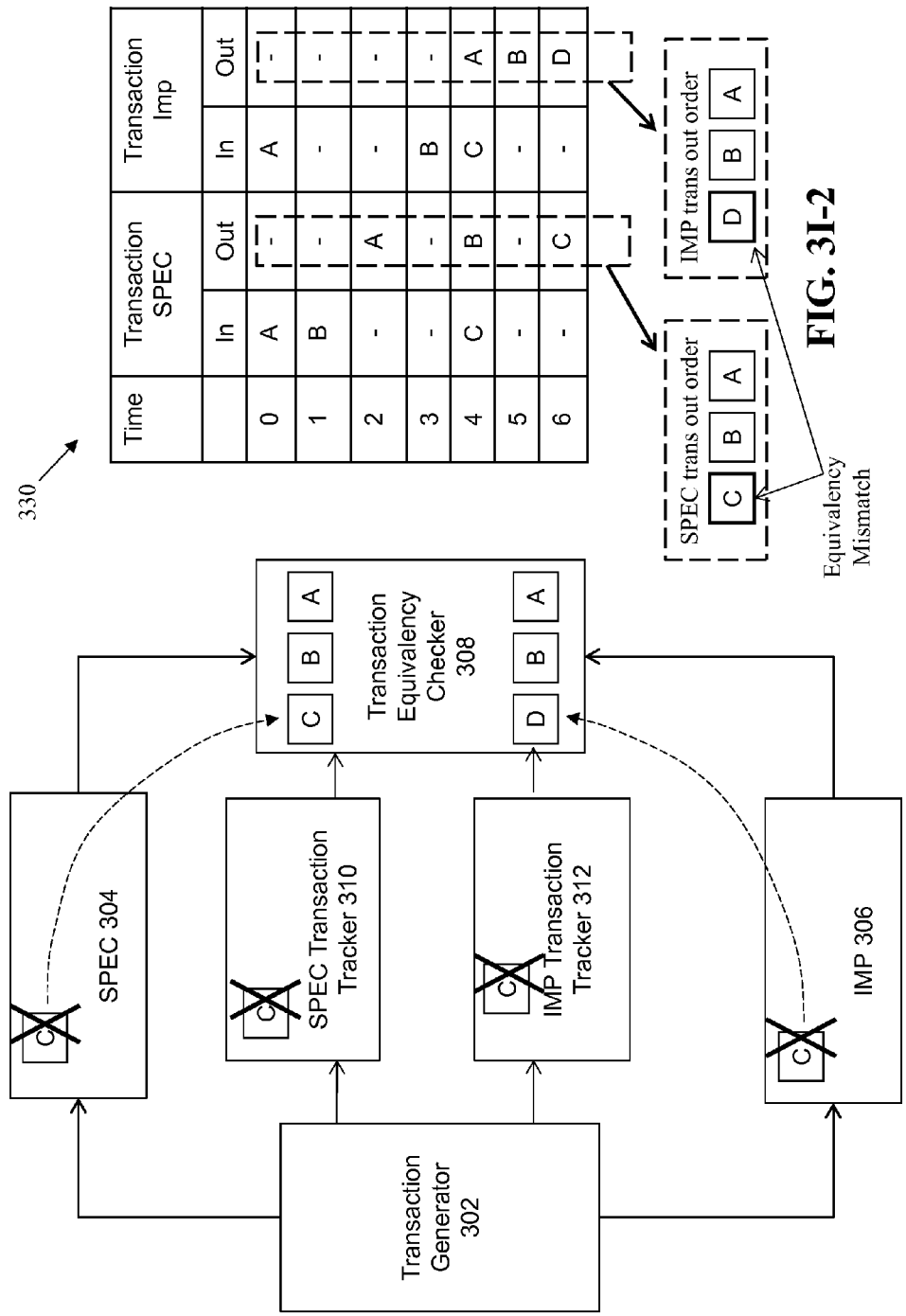

This illustrative example will now present two alternative scenarios in FIG. 3I-1 and FIG. 3I-2.

FIG. 3I-1 shows a first scenario for time 6 where transaction C has now proceeded all the way through both Spec 304 and 306. Table 330 has been updated to reflect that transaction C has proceeded out of both Spec 304 and Imp 306 at time 6.

In this situation, it can be seen from table 330 that the exact same order of transactions A, B, C has been tracked to exit out of both Spec 304 and Imp 306, based upon the exact same order of input transactions A, B, and C. This means that an equivalency match on a transaction basis has been identified. This is regardless of the fact that a cycle-by-cycle mismatch does exists with respect to the input and output times of these transactions.

FIG. 3I-2 shows an alternative situation at time 6 where transaction C has now proceeded all the way through Spec 304. However, instead of C as the output for IMP 306, the detected output is D. Table 330 has been updated to reflect that at time 6, transaction C has proceeded out of Spec 304 and that D has proceeded out of Imp 306.

In this situation, it can be seen from table 330 that there is a mismatch in the ordering and/or content of transactions exiting from Spec 304 and Imp 306. Here, Spec shows an ordering of A, B, and C. In contrast, Imp shows an ordering of A, B, and D. As such, there is clearly a mismatch at the C/D position of the output transactions. This means that an equivalency mismatch on a transaction basis has now been identified. As before, this mismatch is identifiable regardless of the fact that these transaction do not line up correctly when viewed on a cycle-by-cycle basis between Spec 304 and Imp 306.

These results demonstrate that the system is able to verify functional equivalency (or non-equivalency) of the two designs, even though they are not cycle-by-cycle equivalent. Instead, the inventive approach is able to determine that they are equivalent or non-equivalent on a higher-level—the transaction-level. This solution can be applied to perform verification of real-world problems where designs may not be cycle-by-cycle equivalent, such as exists when there are handshaking protocols in the design (e.g., ready-accept protocol).

Figure 4:
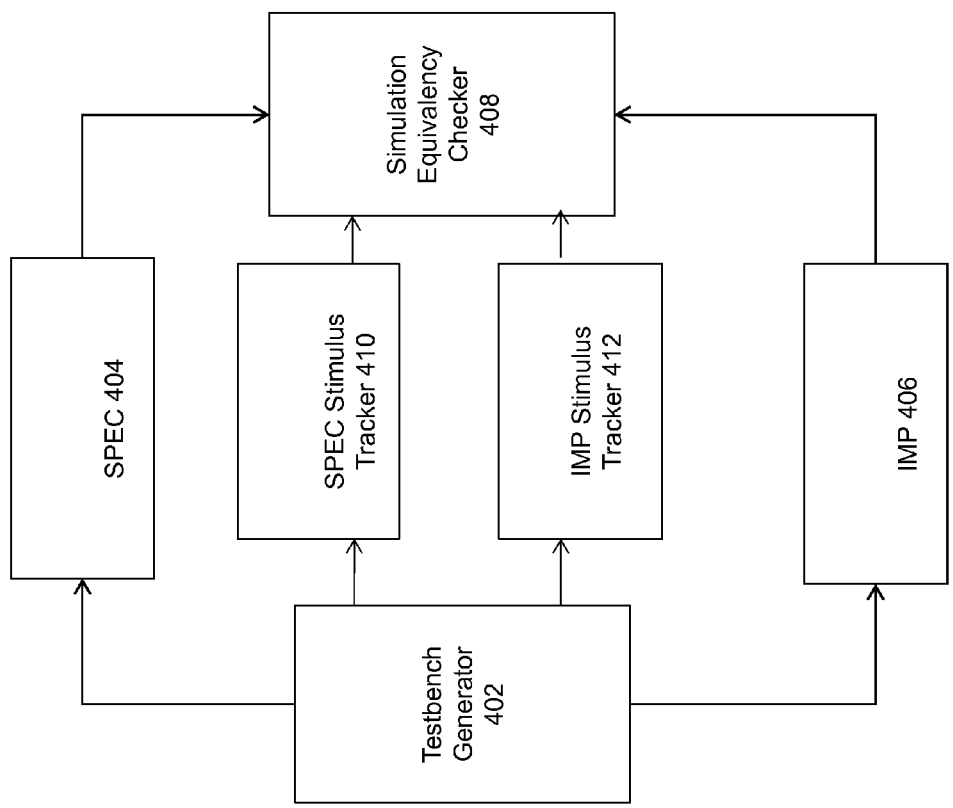
FIG. 4 illustrates another embodiment, where simulation is implemented.

FIG. 4 illustrates another embodiment, where simulation (instead of formal verification) is implemented to perform the verification. Spec 404 represents a configured instance/model of the Spec design and Imp 406 represents a configured instance/model of the Imp design. The testbench generator 402 generates stimulus that are applied to the Spec 404 and Imp 406.

With simulation, careful consideration does need to be taken of the state and status of various components within the state machines representative of the Spec 404 and Imp 406 at given moments in time. Therefore, the testbench generator 402 should operate to ensure that testbench stimulus pushed to the Spec 404 and Imp 406 designs are appropriate in terms of ordering, timing, and content for their state(s) as of the time that the stimulus are applied.

The Spec stimulus tracker 410 tracks stimulus that are applied to the Spec 404. Similarly, the Imp stimulus tracker 412 tracks stimulus that are applied to the Imp 306.

The simulation equivalency checker 408 takes into account the information tracked by trackers 410 and 412 as stimulus are applied to the Spec 404 and Imp 306, and to track the respective output from the Spec 404 and Imp 306. The order of the outputs is then analyzed to determine whether the two design are equivalent.

Figure 5:
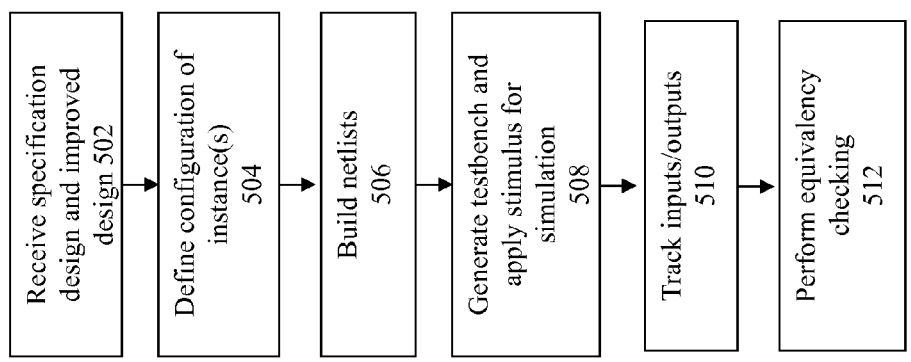
FIG. 5 shows a flowchart of an approach to use simulation to perform equivalency checking according to some embodiments of the invention.

FIG. 5 shows a flowchart of an approach to use simulation to perform equivalency checking according to some embodiments of the invention. At 502, the Imp, Spec, and VIP descriptions are received for processing. The Imp description corresponds to an RTL or gate-level description of an improved design. The Spec description corresponds to an RTL or gate-level description of a specification design. The transaction VIP configuration description includes parameter settings and glue logic to configure the transaction-level equivalency and performance checking VIP.

At 504, configuration is performed of the parameters and logic to be connected using the description elements to instantiate a configured instance of the imp design and a configured instance of the spec design. A configured instance of transaction-level equivalence checking and performance VIP is also instantiated. The VIP includes a consistent transaction generator, Spec transaction tracker, Imp transaction tracker, transaction equivalency checker and/or transaction performance checker.

A synthesis action is then performed at 506 to generate a set of netlists/constraints for the Imp and Spec. The netlists/constraints include the problem statement to be solved by the system.

At 508, a testbench is generated to be applied to the models of the Imp and Spec designs. Any suitable approach may be taken to generate the testbench for simulation. In some embodiments, directed simulation and/or constrained-random simulation methods may be employed. At 510, the stimuli are tracked being applied to the Imp and Spec designs. The outputs from the Imp and Spec designs are also tracked. The same input/output ordering and content are checked implemented for both designs, while remaining flexible with regards to timing.

At 512, analysis results are generated. In the current embodiment, equivalency checking is performed to check for the equivalency of inputs/outputs, where a check is made to determine whether all data that is output by one design is also output by the other in the same order. This is performed regardless of any cycle-based mismatches that may exist.

Another embodiment of the disclosure pertains to the implementation of an efficiency check between the two designs. The general idea is that even if transactional equivalency can be proven, the time delay differences between the two designs can be checked to make sure that the delay differences are not excessive enough to cause operational or performance problems.

Figure 6:
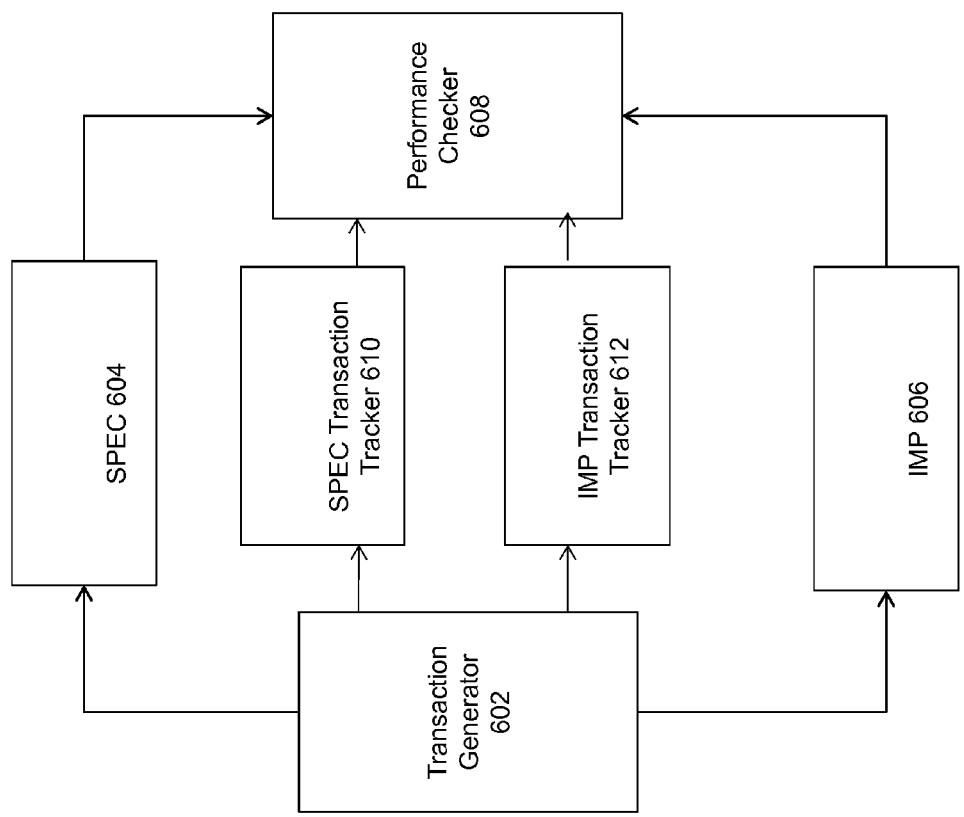
FIG. 6 illustrates an approach to perform performance checks.

FIG. 6 illustrates an approach to perform performance checks. As before, Spec 604 represents a configured instance of the Spec design and Imp 606 represents a configured instance of the Imp design. The transaction generator 602 generates transactions that are pushed to the Spec 604 and Imp 606. The Spec transaction tracker 610 tracks the transactions that enter and exit the Spec 604. Similarly, the Imp transaction tracker 612 tracks transactions that proceed in and out of the Imp 606 design.

The performance checker 608 is the component that determines whether there any performance issues between the two designs. One or more performance requirements may be established for the checking process that corresponds to a threshold delta N between the respective delay amounts. In some cases, N is configured to be the worst-case performance delay difference between Imp and Spec designs to process a transaction.

The performance checker operates by checking whether the time difference delay between Imp and Spec is always less than N. This is implemented by determining the time difference delay for each transaction processed by Imp, determining the time difference delay for each transaction processed by Spec, and then for each transaction computing a delta between the time difference delays for the same transactions. The deltas are compared to the N value to determine whether any of the transactions correspond to a performance problem.

Figure 7:
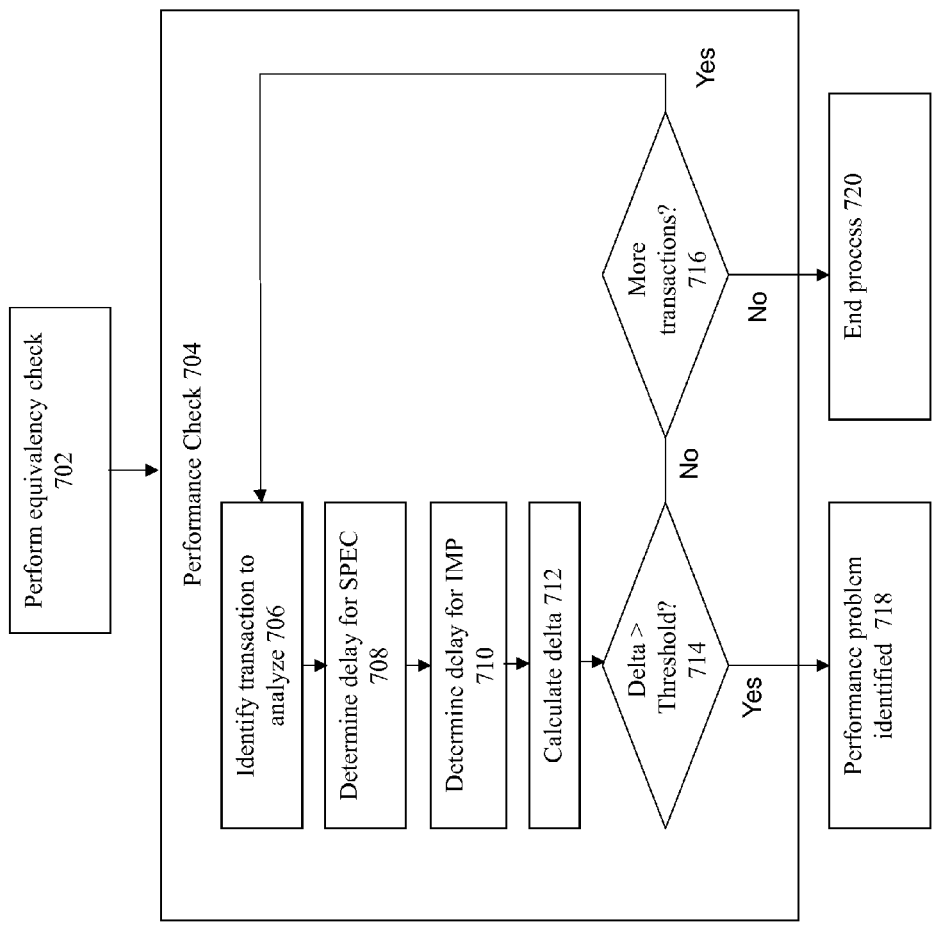
FIG. 7 shows a flowchart of an approach to implement the performance check.

FIG. 7 shows a flowchart of an approach to implement the performance check. At 702, an equivalency check is performed. The equivalency check may be performed using any of the techniques described above. If the equivalency check determines designs are not equivalent, then there is really no need to proceed with the performance check. If, however, the equivalency is present, then the next action at 704 is to check for the existence of any performance problems.

At 706, a transaction is identified for analysis. As previously mentioned, in one embodiment, all of the transactions are checked to enable detection of any performance requirement violations. The process will loop through each of the transactions to check for the existence of a performance problem.

At 708, a time difference delay value is obtained for the transaction for Spec. This is performed, for example, by identifying the time for the input of the transaction to Spec, identifying the time of the output of the transaction from Spec, and then obtaining a difference between those two values. Similarly, at 710, a time difference delay value is obtained for the transaction for Imp. As before, this can be accomplished by identifying the time for the input of the transaction to Imp, identifying the time of the output of the transaction from Imp, and then obtaining a difference between those two values.

A delta value is then calculated at 712 for the two time difference delay values. In some embodiments, this is calculated by simply taking the absolute value of the difference between one of the time difference delay values and the other. This approach is used when only the absolute total of the difference is to be considered, without consideration of whether the time delay needs to be greater for the Spec versus Imp, or vice versa. Alternatively, the calculation of the delta value identified one of the time difference delay values V1 to be subtracted from the other V2, where a positive number indicates that the delay is longer for V1 than V2, a negative number indicates that the delay V2 is longer than V1, and zero if the delays are identical.

Next, at 714, a determination is made whether the delta value exceeds a threshold value N. The threshold value N can be configured, for example, to be the worst-case performance delay difference between Imp and Spec designs to process a transaction. In some embodiments, the same threshold N is applied to all transactions. Alternatively, different values may be established for different transaction. As yet another approach, thresholds may be established for multiple transactions, e.g., a threshold that is applied to the combined delay values for both transactions A and B. Weightings may also be applied to differentially check for performance issues, e.g., where the delay for A is weights to be different than the delay for B.

If the delta exceeds the threshold, then a performance problem is identified at 718. In some embodiments, the checking process would end at this point since a problem is already identified. In an alternate embodiment, the checking process continues to check the rest of the transactions to see if any other performance problems exist.

A determination is made at 716 whether there are any additional transactions that still need to be checked for performance issues. If not, then the process ends at 720. If there are still transaction to be checked, then the process loops back to 706 to select another transaction for processing.

Figure 8A:
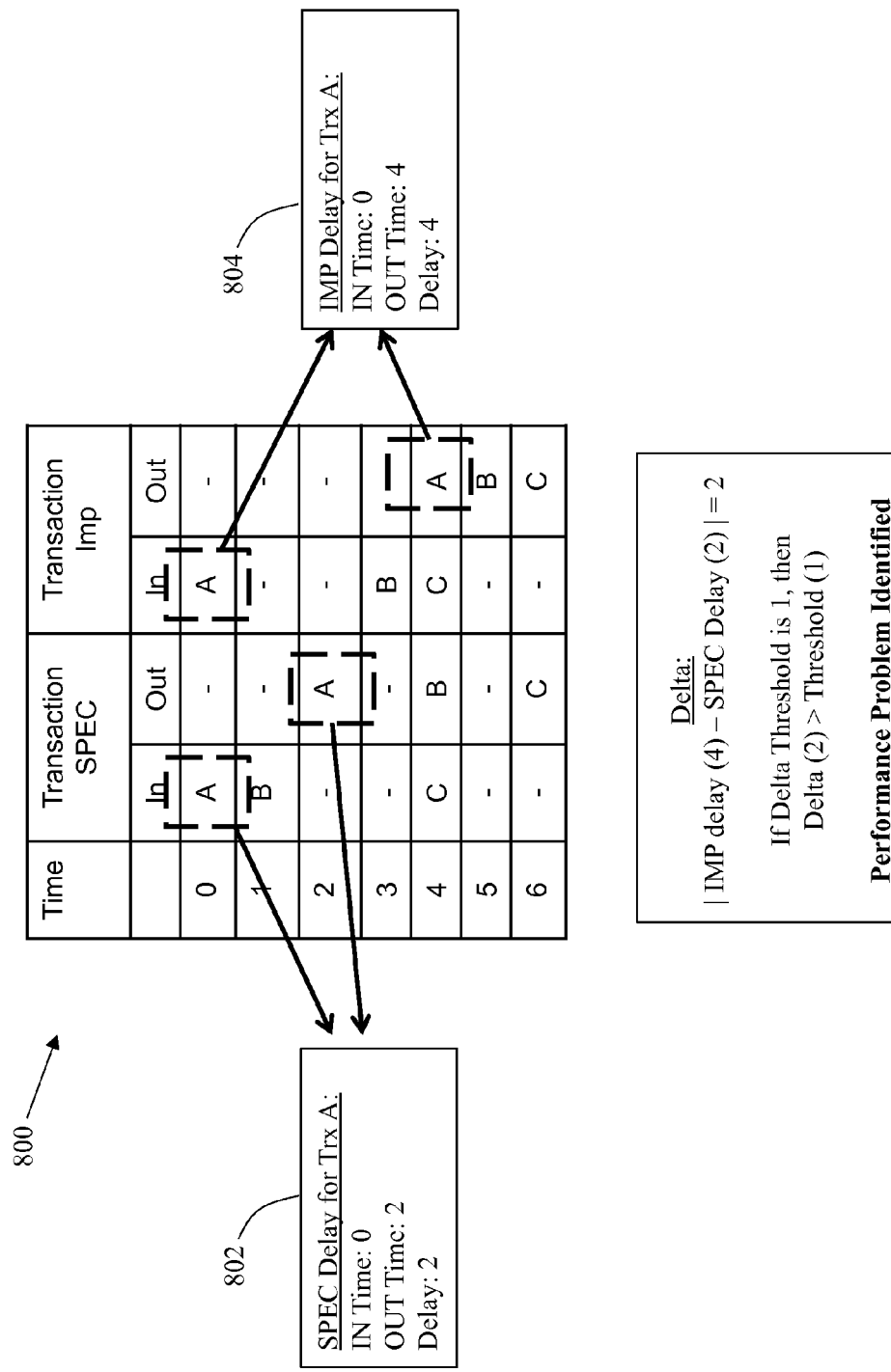
FIGS. 8A-B illustrate performance checking.

To illustrate this embodiment, consider FIG. 8A which shows a table 800 that reproduces the tracking information from the previous example. This table 800 shows the input times and output times for transactions A, B, and C as they were processed by Imp and Spec.

Box 802 shows the process for calculating the time difference delay value for transaction A for Spec. This is performed by first identifying the time for the input of the transaction A to Spec (i.e., IN time is 0). Next, identification is made of the time of the output of the transaction A from Spec (i.e., OUT time is 2). The time difference delay value is then obtained by calculating the difference between those two values (e.g., 2−0=2).

Similarly, Box 804 shows the process for calculating the time difference delay value for transaction A for Imp. This is performed by identifying the time for the input of the transaction A to Imp (i.e., IN time is 0). Next, identification is made of the time of the output of the transaction A from Imp (i.e., OUT time is 4). The time difference delay value is then obtained by calculating the difference between those two values (e.g., 4−0=4).

A delta value is then calculated for the two time difference delay values. The delta values can be calculated by taking the absolute value of the difference between one of the time difference delay values and the other. Here, the Imp delay value is 4 and the Spec delay value is 2. Therefore, if the delta is the difference between these two delay values, then the delta is (4−2) which is a delta of 2.

A determination is then made whether the delta value exceeds a threshold value N. Assume that the threshold value N has been set to 1. In this case, the delta value 2 is greater than the threshold value of 1. Therefore, a performance problem has been identified for transaction A.

Figure 8B:
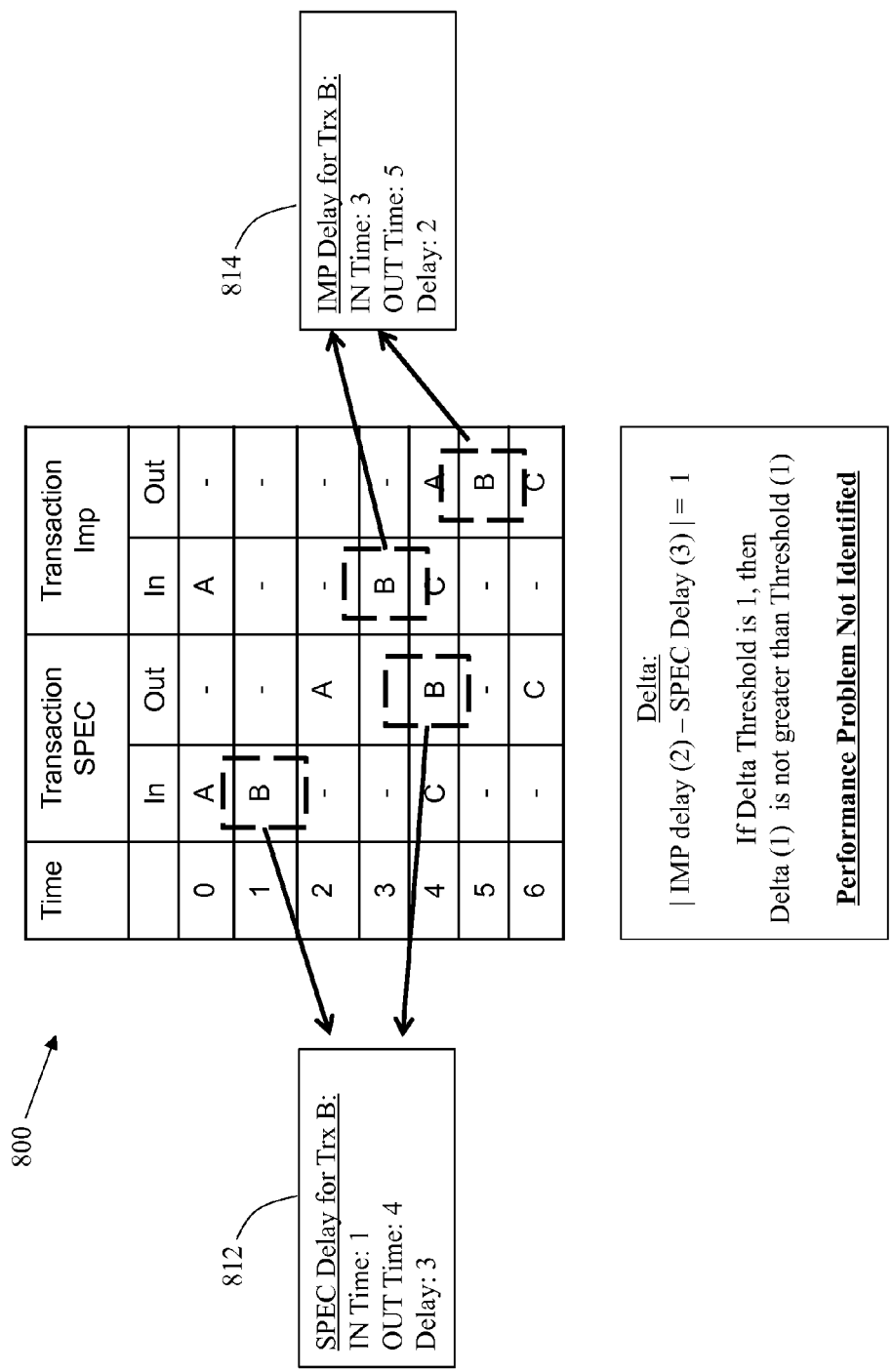

As another example, consider FIG. 8B which illustrates the analysis for possible performance problems for transaction B. This figure also include the table 800 that reproduces the tracking information that shows the input times and output times for transactions A, B, and C as they were processed by Imp and Spec.

Box 812 shows the process for calculating the time difference delay value for transaction B for Spec. This is performed by first identifying the time for the input of the transaction B to Spec (i.e., IN time is 1). Next, identification is made of the time of the output of the transaction B from Spec (i.e., OUT time is 4). The time difference delay value is then obtained by calculating the difference between those two values (e.g., 4−1=3).

Box 814 shows the process for calculating the time difference delay value for transaction B for Imp. This is performed by identifying the time for the input of the transaction B to Imp (i.e., IN time is 3). Next, identification is made of the time of the output of the transaction B from Imp (i.e., OUT time is 5). The time difference delay value is then obtained by calculating the difference between those two values (e.g., 5−3=2).

A delta value is then calculated for the two time difference delay values. The delta values can be calculated by taking the absolute value of the difference between one of the time difference delay values and the other. Here, the Imp delay value is 2 and the Spec delay value is 3. Therefore, if the delta is the difference between these two delay values, then the delta is the absolute value of (2−3) which is a delta of 1.

A determination is then made whether the delta value exceeds a threshold value N. Assume again that the threshold value N has been set to 1. In this case, the delta value 1 is not greater than the threshold value of 1. Therefore, a performance problem has not been identified for transaction B.

This approach allows the system to very effectively perform efficiency checks between two designs.

Therefore, what has been described is an improved approach to implement verification of circuit designs. As a result of applying the above techniques, equivalency and efficiency properties can be generated and verified, proving that both Imp and Spec treat transactions going through designs consistently in both ordering and content. This result can be achieved even when observing the ready-accept handshake protocol that may be in-place for certain designs.

The present disclosure therefore very effectively solves the problem with traditional sequential equivalency checking approaches that cannot function properly when the two designs are not matchable on a cycle-by-cycle basis. This occurs, for example, in the context of designs whose interface validity is governed by handshake protocols.

The present disclosure is also applicable to address other problems that may prevent proper functioning of equivalency checks in similar circumstances. For example, matching functions are another technique that often fails in certain circumstances, e.g., in the context of designs whose interface validity is governed by handshake protocols. In this circumstance, the traditional matching function approach may also fail to determine whether the two designs are equivalent at their design interfaces. The approach of the present disclosure can also be used to provide an improved approach to perform equivalency checks with regards to function matching as well, by checking two designs to see if they are equivalent on the transaction-level.

The foregoing description of the embodiments of the disclosure has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

System Architecture Overview

Figure 9:
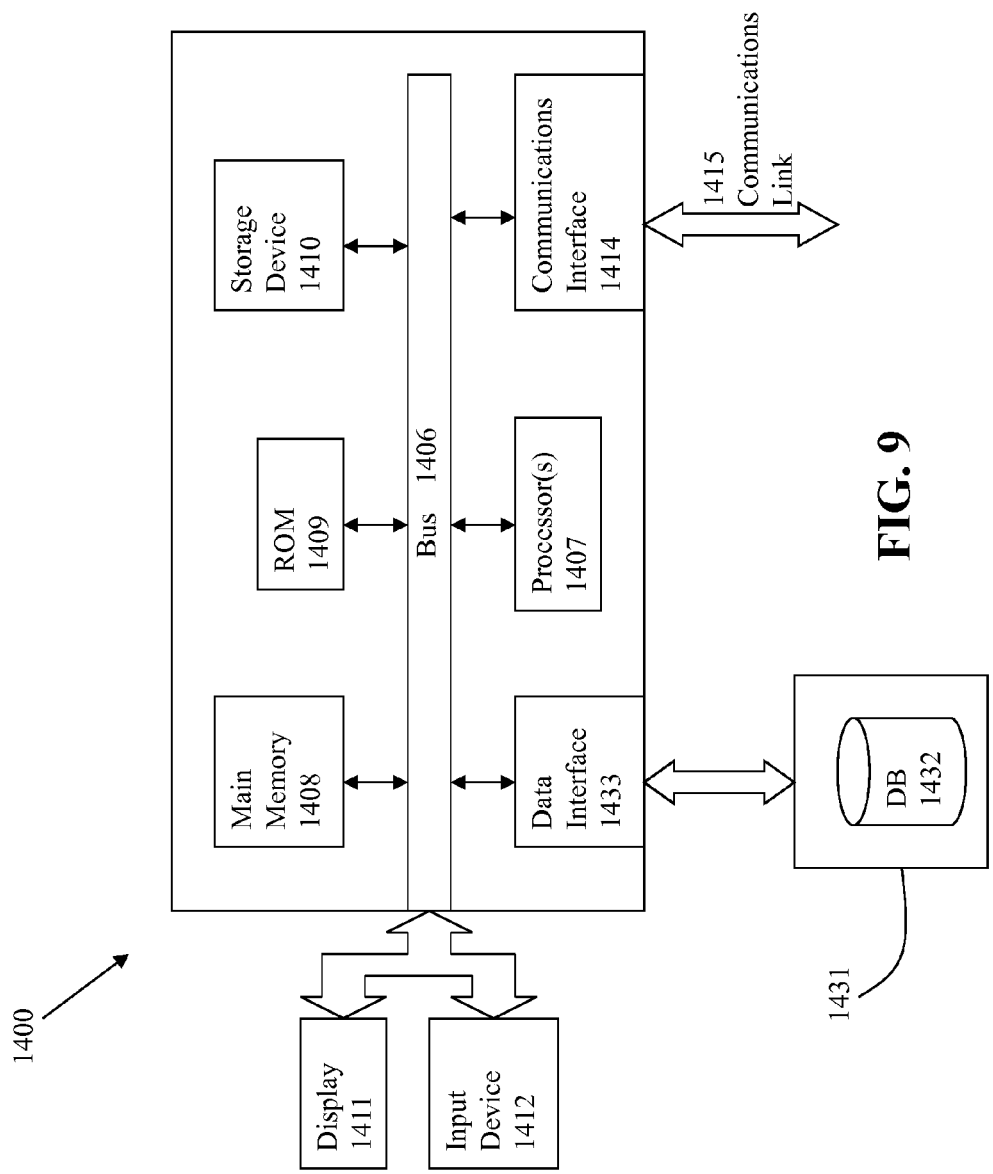
FIG. 9 is a diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for circuit design verification, comprising:

identifying a specification design representing a version an electronic design and an implementation design representing a different version of the electronic design;

applying a set of transactions in a specified order to the specification design and the implementation design;

tracking outputs from the specification design and the implementation design, where a first order of transactions is output from the specification design, and a second order of transactions is output from the implementation design;

identifying a first time different delay for a transaction for the specification design;

identifying a second time different delay for a transaction for the implementation design;

calculating a delta value between the first time different delay and the second time different delay; and determining whether a performance requirement is met by comparing the delta value to a threshold value.

2. The method of claim 1, wherein the threshold value corresponds to a worst-case performance delay difference to process a transaction.

3. The method of claim 1, wherein every transaction is checked for existence of the performance problem.

4. The method of claim 1, wherein an equivalency check is performed prior to checking for existence of the performance problem.

5. The method of claim 1, wherein the threshold value corresponds to multiple transactions.

6. The method of claim 1, wherein different threshold values correspond to different transactions.

7. The method of claim 1, wherein the threshold value corresponds to a combined delay for multiple transactions.

8. A computer program product embodied on a computer usable medium, the computer usable medium having stored thereon a sequence of instructions which, when executed by a processor causes the processor to execute a method, the method comprising:

identifying a specification design representing a version an electronic design and an implementation design representing a different version of the electronic design;

applying a set of transactions in a specified order to the specification design and the implementation design;

tracking outputs from the specification design and the implementation design, where a first order of transactions is output from the specification design and a second order of transactions is output from the implementation design;

identifying a first time different delay for a transaction for the specification design;

identifying a second time different delay for a transaction for the implementation design;

calculating a delta value between the first time different delay and the second time different delay; and determining whether a performance requirement is met by comparing the delta value to a threshold value.

9. The computer program product of claim 8, wherein the threshold value corresponds to a worst-case performance delay difference to process a transaction.

10. The computer program product of claim 8, wherein every transaction is checked for existence of the performance problem.

11. The computer program product of claim 8, wherein an equivalency check is performed prior to checking for existence of the performance problem.

12. The computer program product of claim 8, wherein the threshold value corresponds to multiple transactions.

13. The computer program product of claim 8, wherein different threshold values correspond to different transactions.

14. The computer program product of claim 8, wherein the threshold value corresponds to a combined delay for multiple transactions.

15. A system, comprising:
a processor;
a memory for holding programmable code, and wherein the programmable code includes instructions which, when executed by the processor, cause the processor to identify a specification design representing a version an electronic design and an implementation design representing a different version of the electronic design;

apply a set of transactions in a specified order to the specification design and the implementation design;

track outputs from the specification design and the implementation design, where a first order of transactions is output from the specification design, and a second order of transactions is output from the implementation design;

identify a first time different delay for a transaction for the specification design;

identify a second time different delay for a transaction for the implementation design;

calculate a delta value between the first time different delay and the second time different delay; and determine whether a performance requirement is met by comparing the delta value to a threshold value.

16. The system of claim 15, wherein the threshold value corresponds to a worst-case performance delay difference to process a transaction.

17. The system of claim 15, wherein every transaction is checked for existence of the performance problem.

18. The system of claim 15, wherein an equivalency check is performed prior to checking for existence of the performance problem.

19. The system of claim 15, wherein the threshold value corresponds to multiple transactions.

20. The system of claim 15, wherein different threshold values correspond to different transactions.

21. The system of claim 15, wherein the threshold value corresponds to a combined delay for multiple transactions.

* * * * *